United States Patent Office.

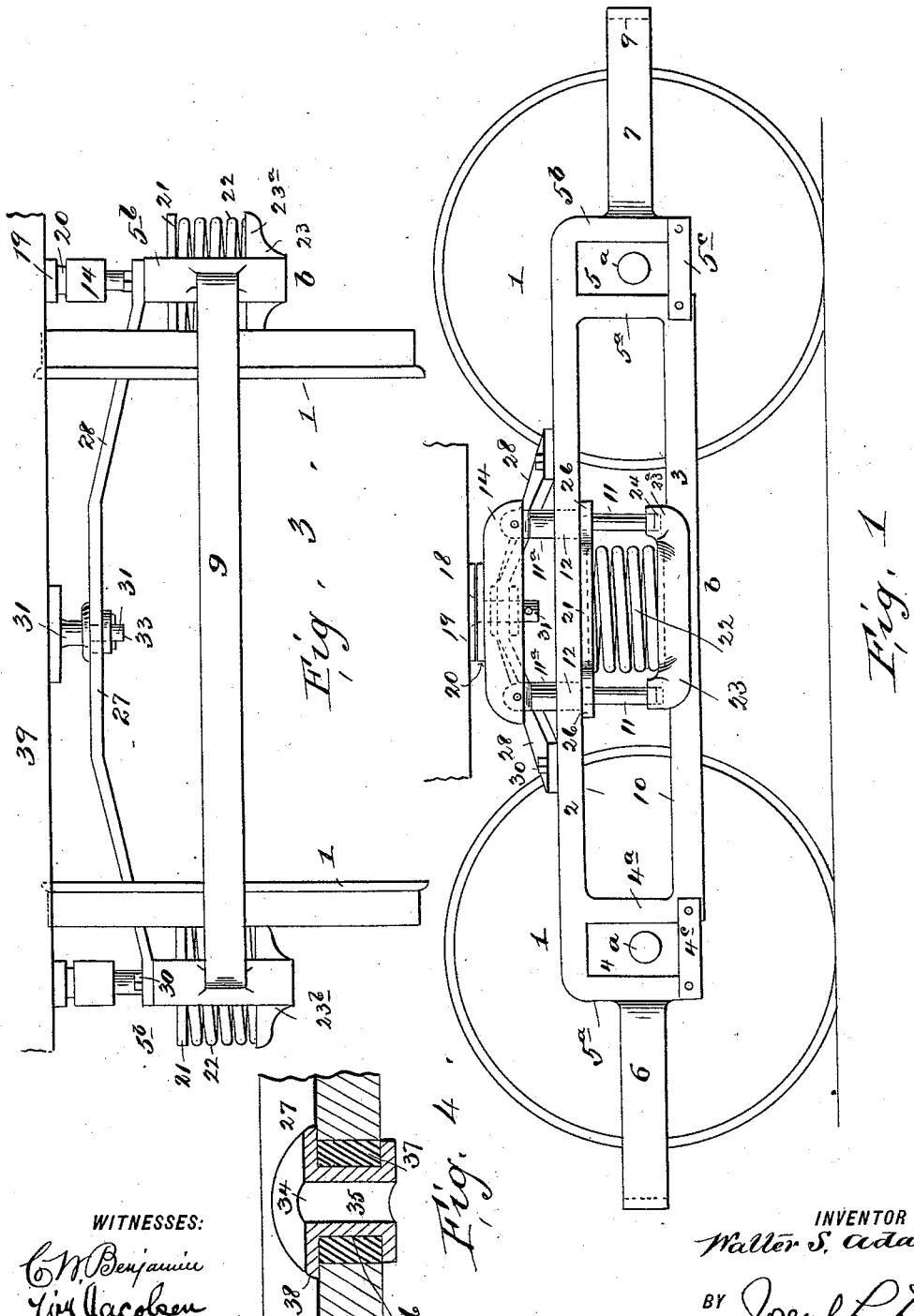

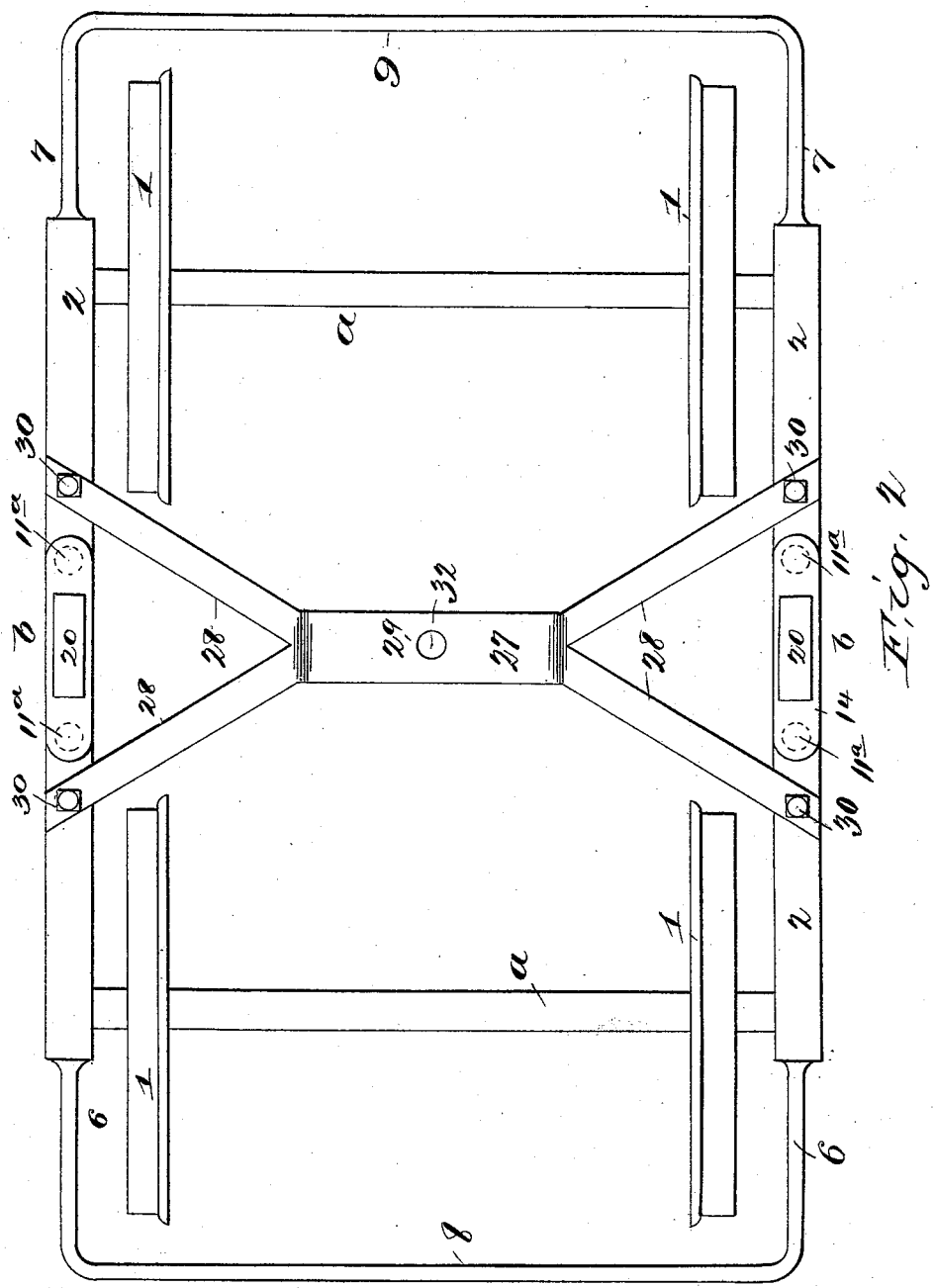

WALTER S. ADAMS, OF PHILADELPHIA, PENNSYLVANIA, ASSIGNOR TO JOHN A. BRILL, OF SAME PLACE.

CAR-TRUCK.

SPECIFICATION forming part of Letters Patent No. 538,859, dated May 7, 1895.

Application filed February 16, 1895. Serial No. 538,613. (No model.)

*To all whom it may concern:*

Be it known that I, WALTER S. ADAMS, a citizen of the United States, residing at Philadelphia, in the county of Philadelphia and State of Pennsylvania, have made certain new and useful Improvements in Car-Trucks, (Case No. 111,) of which the following is a specification.

My improvements relate more specifically to pivotal motor trucks, and are shown as applied to a car truck, in which the wheels are of the same size, and in which the car supporting springs are located about midway between the wheels and on a line with the pivotal center of the truck.

The present object of the invention is to provide a solid, substantial and economical truck, among the main features of which are supporting the car springs on the axle box frame, which is substantially stationary as regards the movement of the car on the springs, and making a drawing connection between the car and truck in such a way that the truck portion of such connection will not partake of the movement of the car body on its moving springs.

My present invention relates to the subject matter of a joint application made by John A. Brill and myself, filed January 3, 1894, Serial No. 495,546.

My invention consists in the novel details of improvement, and the combination of parts that will be more fully hereinafter set forth and then pointed out in the claims.

Reference is had to the accompanying drawings, forming part hereof, wherein—

Figure 1 is a side elevation of the truck, showing a portion of the car-sill; Fig. 2, a plan view; Fig. 3, an end elevation; and Fig. 4, a detail sectional elevation, enlarged, of the bolster and the bearing for the king-pin.

Similar numerals and letters of reference refer to like parts throughout the accompanying views.

In the accompanying drawings the numerals 1, 1 indicate the truck wheels and $a$ the axles thereof.

$b, b$ are the side bars of the axle box frame, which comprise the upper and lower chords 2 and 3, the axle box yokes 4 and 5, extensions 6 and 7 from the outer legs of the axle box yokes, and cross bars 8 and 9 connecting the ends of said extensions.

The chords 2 and 3 of the axle box frame are shown extending in parallel lines at suitable distances apart, forming between them a space 10 for a purpose hereinafter specified. The chord 3 is connected at its ends to the uprights $4^a$, $5^a$ of the axle box yokes 4, 5, respectively, which uprights are connected to the top chords 2, which latter extend beyond said uprights and are connected to the outer vertical members $4^b$, $5^b$ of said yokes. By this means the side bars and yokes are united into a firm structure. The lower parts of the yokes 4, 5 may be connected by tie bars $4^c$, $5^c$.

The extensions 6, 7 are shown secured to, and extending from, the members $4^b$, $5^b$ of the yokes 4, 5, and said extensions are substantially on a plane extending midway between the chords, 2, 3, whereby the strain on the yokes is better distributed.

The parts 2, 3, $4^a$, $4^b$, $5^a$, $5^b$, 6, 7, 8 and 9 together form the axle box frame, and may be united into a homogeneous mass of metal.

The side bars are shown wider than the extensions 6, 7, whereby guides or pedestals are formed for the spring posts 11, 11.

I do not claim the structure of the axle box frame in this application, as the same is claimed in the application above referred to.

The spring posts 11, 11 are guided to have vertical movement in openings or bearings 12 in the top chords 2, 2, bushings hereinafter described being preferably provided to receive said posts. The posts 11 are shown arranged in pairs on each side of the axle box frame, and said pair of posts are provided with bearings 14, preferably pivotally connected with said posts as shown.

At 18 is one of the longitudinal sills of the car, to which a rub plate 19 is secured, and to the bearing 14 is secured a friction plate 20, on which the rub plate 19 bears, the car body being in this way pivotally supported upon the bearing 14.

The posts 11, 11 have enlarged upper parts $11^a$, $11^a$ that enter the bearings 12 in the top chord 2, and which rest on a plate 21 that is supported on the side or car spring 22. (See Fig. 1.) The spring 22 is shown in the form of a coil spring and rests on a cradle 23 that is supported on the chord 3 of the axle box frame. This cradle has at its ends lugs 23ª and recesses 24 in the lugs, in which the lower ends of the posts 11 are received and guided. The cradle 23 has a central recess 25 in which the side spring 22 rests, and a longitudinal recess that receives the chord 3, whereby the cradle 23 is held on said chord and lateral movement thereon prevented. (See Fig. 3.) Means may be employed to prevent the cradle from sliding on the lower chord or for having a rocking movement thereon, as set forth in the before-mentioned application.

The central portion of the cradle 23 is enlarged as at 23ª to provide room for the spring 22, as shown in Fig. 3. The plate 21 may also be provided with a recess on its under side, in which the upper end of the coil spring 22 is located. The plate 21 is provided with oppositely extending lugs or webs 26 having apertures through which the posts 11 pass, the enlarged parts 11ª of said posts resting on said lugs or webs. (See Fig. 1.) With this construction the weight of the car is transmitted from the posts 11 to the plate 21, and then to the spring 22. As the posts are located on opposite sides of the single central spring 22, the weight will be evenly distributed on said spring through the medium of the plate 21.

While I have described but one spring 22 and its connections, it will be understood that there will be a set of such devices on each side of the axle box frame. In this construction the chord 2 forms the pedestal for the spring posts, and the lower chord 3 forms the bolster for supporting the car spring.

With the foregoing construction the weight of the car body will be carried between the wheels 1, 1, whereby pounding of the wheels upon the rails will be prevented, and the entire structure made uniformly strong, simple and compact.

The bearings 14 and the means for spring supporting and guiding the same are described in an application filed by said John A. Brill and myself on the 17th day of February, 1893, Serial No. 462,730, and I therefore do not claim the same herein but make cross reference thereto.

The drawing connection between the truck and car is constructed as follows: At 27 is a cross bar or truck bolster carried by the upper chord 2 of the axle box frame, said cross bar being shown in Fig. 3 in substantially the shape of an arch to enable it to rise upward toward the car body to make connection therewith, the arch thus affording space for a motor beneath. The cross bar 27 is shown bifurcated or forked at its ends at 28, said forks extending from the flat and central part 29 of said cross bar, and at their ends the forks are connected to and supported upon the upper chords 2 and secured in place by bolts 30 or otherwise. The forks 28 diverge considerably from the part 29, forming a wide V shaped space, whereby the central part of said cross bar is strongly braced to resist lateral strain by the king pin 31, within which space the side bearings, rub and friction plates lie. The king pin 31, for making the drawing and swiveling connection directly with the axle box frame, depends from a cross sill 39 and passes through a central opening 32 in the cross bar 27, and may be restrained from excessive vertical movement and displacement by a cotter pin 33 or the like. The opening 32 in the cross bar 27, as well as the bearings 12 in the top chord 2, is preferably provided with a bushing or casting 34 to receive the king pin 31, said bushing having an opening 35 for said pin (see Fig. 4), which opening would of course be larger when used in connection with the spring post enlargements 11ª.

The bushing or casting 34 is circular in form having a central annular recess 36, in which is fitted a rubber cushion 37, the opening 32 in the cross bar 27 being sufficiently large to receive said bushing and cushion. The bushing or casting 34 has an annular flange 38 on its upper side to rest on the cross bar 27. The bushing 34 may be of brass or other anti-friction metal, and the cushion 37 reduces the concussion between the cross bar 27 and king pin 31 and enables the parts to give slightly. This king pin 31 is located at the pivotal center of the truck, and it acts with the cross bar 27 to draw between the car body and truck.

The king pin may be secured to the car body or the sill thereof in any desired manner.

Many changes and modifications can be made in the structure shown herein without departing from the spirit of my invention.

I claim—

1. A car truck having an axle box frame and side bars outside the wheels, bearings spring supported in and guided by said side bars and located between the wheels, arms supported upon said side bars at each side of said bearings and extending inwardly between the wheels, a cross bar supported by the inner ends of the arms, said cross bar having a king pin bearing, substantially as described.

2. A car truck and an axle box frame thereof having side bars, a cross bar forked at its ends, the forks at each end passing between the wheels and supported on the side bars, the cross bar being raised above the frame of said forks, and provided with a king pin bearing, substantially as described.

3. In a car truck, the combination, with an axle box frame having side bars, of a cross bar provided with a central flat and elevated portion 29 and diverging forked parts 28 secured at their ends upon said side bars between the wheels, a car body, a vertical pivot between said car body and portion 29 of the cross bar, and spring supported side bearings on the side bars between the forked parts, and rub plates on the car body engaging the bearings, substantially as described.

4. The combination, with a car body, a truck, of an axle box frame having side bars, a bifurcated cross bar extending between said side bars and supported upon the same between the wheels, an aperture in said cross bar, a bushing and elastic cushion within said aperture, and a king pin secured to the car body and passing through said bushing, and bearings spring supported upon the side bars between the forked ends of the cross bar engaging rub plates secured to the car body, substantially as described.

WALTER S. ADAMS.

Witnesses:
R. S. REED,
EDW. C. BROADBENT.